(12) United States Patent
Yokomakura et al.

(10) Patent No.: US 8,995,561 B2
(45) Date of Patent: Mar. 31, 2015

(54) COMMUNICATION APPARATUS, CONTROL PROGRAM FOR THE SAME, AND INTEGRATED CIRCUIT

(75) Inventors: Kazunari Yokomakura, Osaka (JP); Yasuhiro Hamaguchi, Osaka (JP); Osamu Nakamura, Osaka (JP); Jungo Goto, Osaka (JP); Hiroki Takahashi, Osaka (JP); Yosuke Akimoto, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 34 days.

(21) Appl. No.: 13/520,501

(22) PCT Filed: Dec. 20, 2010

(86) PCT No.: PCT/JP2010/072933
§ 371 (c)(1),
(2), (4) Date: Sep. 13, 2012

(87) PCT Pub. No.: WO2011/083681
PCT Pub. Date: Jul. 14, 2011

(65) Prior Publication Data
US 2012/0328044 A1 Dec. 27, 2012

(30) Foreign Application Priority Data
Jan. 5, 2010 (JP) ................................. 2010-000767

(51) Int. Cl.
*H04L 27/00* (2006.01)
*H04L 5/00* (2006.01)
(Continued)

(52) U.S. Cl.
CPC ............ *H04L 5/0039* (2013.01); *H04L 5/0028* (2013.01); *H04L 5/0035* (2013.01);
(Continued)

(58) Field of Classification Search
USPC .......... 375/295, 259, 260, 267, 285, 296, 299
See application file for complete search history.

(56) References Cited

U.S. PATENT DOCUMENTS 8,254,942 B2 * 8/2012 McBeath et al. .............. 455/450
8,526,529 B2 * 9/2013 Ahn et al. ..................... 375/295
(Continued)

FOREIGN PATENT DOCUMENTS

| JP | 2009-171025 A | 7/2009 |
|----|---------------|--------|
| JP | 2009-188675 A | 8/2009 |
| WO | WO 2009/154270 A1 | 12/2009 |

OTHER PUBLICATIONS

Awad, Resource Allocation, PCT/JP2009/068943 filed on Oct. 29, 2009 in English (US 2011/0222489 A1).*

(Continued)

*Primary Examiner* — Siu Lee
(74) *Attorney, Agent, or Firm* — Birch, Stewart, Kolasch & Birch, LLP (57) ABSTRACT

In a radio communication method non-contiguously using a frequency, notification information is reduced, while suppressing an effect on performance. In a communication apparatus which switches between a communication method contiguously using a frequency and a communication method non-contiguously using the frequency, sets a parameter corresponding to each communication method, and performs radio communication, the communication apparatus sets a same parameter to an entire frequency band in the communication method contiguously using the frequency, while dividing a frequency band into a plurality of frequency bands and setting a different parameter for each divided frequency band in the communication method non-contiguously using the frequency. The communication method contiguously using the frequency and the communication method non-contiguously using the frequency mutually have different PAPR (Peak to Average Power Ratio) characteristics.

2 Claims, 8 Drawing Sheets

(51) Int. Cl.
*H04L 27/26* (2006.01)
*H04B 7/12* (2006.01)
*H04B 7/06* (2006.01)

(52) U.S. Cl.
CPC .......... H04L5/0041 (2013.01); H04L 5/0092 (2013.01); H04L 27/2614 (2013.01); *H04B 7/12* (2013.01); *H04L 5/0023* (2013.01); *H04B 7/0619* (2013.01)
USPC .......... 375/295; 375/259; 375/260; 375/267; 375/285; 375/296; 375/299

(56) References Cited

U.S. PATENT DOCUMENTS

| | | | |
|---|---|---|---|
| 8,542,645 B2* | 9/2013 | Parkvall et al. | 370/329 |
| 2010/0002598 A1* | 1/2010 | Pan et al. | 370/252 |
| 2010/0027456 A1* | 2/2010 | Onggosanusi et al. | 370/312 |
| 2010/0034152 A1* | 2/2010 | Imamura | 370/329 |
| 2010/0091919 A1* | 4/2010 | Xu et al. | 375/346 |
| 2010/0142455 A1* | 6/2010 | Imamura | 370/329 |
| 2010/0195604 A1* | 8/2010 | Papasakellariou et al. | 370/329 |
| 2011/0110322 A1 | 5/2011 | Koyanagi et al. | |
| 2011/0116408 A1* | 5/2011 | Kim et al. | 370/252 |
| 2011/0134868 A1* | 6/2011 | Lee et al. | 370/329 |
| 2011/0141876 A1* | 6/2011 | Kuchi et al. | 370/203 |
| 2011/0149944 A1* | 6/2011 | Ko et al. | 370/344 |
| 2011/0164519 A1* | 7/2011 | Nishio et al. | 370/252 |
| 2011/0222489 A1* | 9/2011 | Awad | 370/329 |

OTHER PUBLICATIONS

Iwai, Takashi et al.: "System performance evaluation on non-contiguous frequency resource allocation for LTE-Advanced uplink", Technical report of IEICE, RCS, Jul. 27, 2009, RCS2009-85, vol. 109, No. 164, pp. 43-48.
Nakamura, Osamu et al.: "A study on Frequency Selective Precoding for Clustered DFT-S-OFDM", Technical report of IEICE, RCS, Dec. 17, 2009, RCS2009-175, vol. 109 No. 341, pp. 49-54.
PCT/ISA/210—International Search Report mailed Feb. 8, 2011, issued in PCT/JP2010/072933.
Sharp. "Considerations on multiple precoding scheme for clustered DFT-S-OFDM", 3GPP TSG RAN WG1 Meeting #58bis, R1-094029, Oct. 12-16, 2009.

* cited by examiner

COMMUNICATION APPARATUS, CONTROL PROGRAM FOR THE SAME, AND INTEGRATED CIRCUIT

TECHNICAL FIELD

The present invention relates to a transmit diversity technique in which same data is transmitted from a plurality of antennas and, in particular, to a reduction method of an amount of control information of which a reception apparatus notifies a transmission apparatus.

BACKGROUND ART

In a next-generation cellular system, it has been examined to use DFT-S-OFDMA (it is an abbreviation for Discrete Fourier Transform Spread Orthogonal Frequency Division Multiple Access, and is also referred to as SC-FDMA (Single Carrier Frequency Division Multiple Access) or DFT Precoded OFDM) as an uplink communication method. A DFT-S-OFDMA signal has features to arrange a signal in continuous subcarriers, and to have a property of a signal of a single carrier method. Consequently, it can be said that DFT-S-OFDM is a method with an excellent PAPR (Peak to Average Power Ratio) characteristic. Further, a communication method called Clustered DFT-S-OFDM has been proposed for the purpose of improving a spectrum efficiency. This method is the method in which a frequency signal generated by DFT-S-OFDM is divided into groups configured with a plurality of subcarriers called Clusters to thereby non-contiguously utilize a frequency, deterioration of the PAPR characteristic is allowed, and in which a frequency selection diversity effect and the spectrum efficiency are enhanced.

In addition, a transmit diversity technique is under review in which same data are transmitted from a plurality of antennas to thereby improve a reception characteristic. Although there are various transmit diversity techniques, they can be roughly classified into two: one is open loop transmit diversity which does not need channel state information at a transmission side (hereinafter referred to as OLTxD), and the other is closed loop transmit diversity which needs the channel state information at the transmission side (hereinafter referred to as CLTxD). One of the CLTxD is a method for controlling a phase of each transmission antenna to improve reception sensitivity (hereinafter, referred to as precoding), and various discussions have been made thereon.

Precoding includes a case where precoding common to all frequency bands to be used is performed and a case where different precoding is performed depending on the frequency band. Hereinafter, in the present invention, a transmission method which performs same precoding in all frequency regions to be used is referred to as single precoding, and a transmission method which performs different precoding for each frequency region is referred to as multiple precoding. Non-Patent Document 1 has described an advantage of performing different precoding for each frequency region.

CITATION LIST

Non-Patent Document

Non-Patent Document 1: R1-094029, Sharp, "Considerations on multiple precoding scheme for clustered DFT-S-OFDM", 3GPP RAN WG1 #58bis, October, 2009

DISCLOSURE OF THE INVENTION

Problems to be Solved by the Invention

However, when a radio communication system becomes complicated, notification information (control information) required to perform communication increases. A case of using a plurality of access methods is one example of the above, and for example, can be considered a case where a transmit diversity technique of using DFT-S-OFDM and Clustered-DFT-S-OFDM, and also using a plurality of transmission antennas is applied. In this case, if only the DFT-S-OFDM is used, a base station apparatus transmits control information on single precoding to a mobile station apparatus. However, when use of the Clustered DFT-S-OFDM is taken into consideration, communication performance is better when precoding is performed for each Cluster, and thus it is better for the base station apparatus to also transmit control information on multiple precoding to the mobile station apparatus. However, since different precoding is performed for each frequency region in multiple precoding, control information becomes large. In addition, Non-Patent Document 1 has not touched on reduction of notification information of which the base station apparatus notifies the mobile station apparatus.

The present invention is made in view of such a situation, and has an object to provide a communication apparatus, a control program for the same, and an integrated circuit which can reduce notification information while suppressing an effect on performance in a radio communication method non-contiguously using a frequency.

Means for Solving the Problems (1) In order to achieve the above-described object, an embodiment of the present invention takes the following measures. Namely, a communication apparatus of the present invention is the communication apparatus which switches between a communication method contiguously using a frequency and a communication method non-contiguously using the frequency, sets a parameter corresponding to each communication method, and performs radio communication, wherein the communication apparatus sets a same parameter to an entire frequency band in the communication method contiguously using the frequency, and meanwhile divides a frequency band into a plurality of frequency bands and sets a different parameter for each divided frequency band in the communication method non-contiguously using the frequency.

As described above, since the communication apparatus sets the same parameter to the entire frequency band in the communication method contiguously using the frequency, while dividing the frequency band into the plurality of frequency bands and setting the different parameter for each divided frequency band in the communication method non-contiguously using the frequency, it becomes possible to obtain a reception characteristic improvement effect by a small amount of control information.

(2) In addition, a communication apparatus of the embodiment of the present invention is the communication apparatus which switches between a communication method contiguously using a frequency and a communication method non-contiguously using the frequency, sets a parameter corresponding to each communication method, and performs radio communication, wherein the communication apparatus sets a same parameter to an entire frequency band in the communication method contiguously using the frequency, and meanwhile sets a different parameter for each non-contiguously arranged frequency band in the communication method non-contiguously using the frequency.

As described above, since the communication apparatus sets the same parameter to the entire frequency band in the communication method contiguously using the frequency while setting the different parameter for each non-contiguously arranged frequency band in the communication method non-contiguously using the frequency, it becomes possible to reduce control information as much as possible, while obtaining a gain with which a parameter can be set for each frequency band.

(3) In addition, in the communication apparatus of the embodiment of the present invention, the communication apparatus can be applied to a plurality of types of radio communication systems each having a different system bandwidth, and determines the maximum number of frequency bands for which the parameter is set according to the system bandwidth in the communication method non-contiguously using the frequency.

As described above, since the communication apparatus determines the maximum number of frequency bands for which the parameter is set according to the system bandwidth in the communication method non-contiguously using the frequency, such a problem can be solved that an effect differs in setting a parameter for each frequency band also in a system having a variable system bandwidth.

(4) In addition, in the communication apparatus of the embodiment of the present invention, the communication method contiguously using the frequency and the communication method non-contiguously using the frequency mutually have different PAPR (Peak to Average Power Ratio) characteristics.

As described above, since the communication method contiguously using the frequency and the communication method non-contiguously using the frequency mutually have different PAPR (Peak to Average Power Ratio) characteristics, the communication apparatus of the present invention can set different control information according to the PAPR characteristics.

(5) In addition, in the communication apparatus of the embodiment of the present invention, the communication method contiguously using the frequency and the communication method non-contiguously using the frequency mutually have a same amount of information required to provide notification of parameters corresponding to the communication methods.

As described above, since the communication method contiguously using the frequency and the communication method non-contiguously using the frequency mutually have the same amount of information required to provide notification of the parameters corresponding to the communication methods, the communication apparatus can set a parameter while reducing an amount of control information even when non-contiguously using the frequency.

(6) In addition, in the communication apparatus of the embodiment of the present invention, parameters corresponding to the communication methods are the parameters used for closed loop transmit diversity (CLTxD).

As described above, since the parameters corresponding to the communication methods are the parameters used for closed loop transmit diversity (CLTxD), the communication apparatus can make amounts of information of the parameters have a little difference between in a case of contiguously using the frequency and in a case of non-contiguously using the frequency in performing transmit diversity control.

(7) In addition, in the communication apparatus of the embodiment of the present invention, the communication apparatus specifies a minimum or a maximum frequency, and a frequency bandwidth thereof in each of the non-contiguously arranged frequency band, and sets the parameter for each of the specifications.

As described above, since the communication apparatus specifies the minimum or the maximum frequency, and the frequency bandwidth thereof, and sets the parameter for each of the specifications in each of the non-contiguously arranged frequency bands, three parameters can be set without any difficulty even when the frequency band is divided into three.

(8) In addition, a control program for a communication apparatus of the embodiment of the present invention is the control program for a communication apparatus which switches between a communication method contiguously using a frequency and a communication method non-contiguously using the frequency, sets a parameter corresponding to each communication method, and performs radio communication, wherein the control program converts a series of processing into commands so as to enable a computer to read and execute them, the series of processing including processing of setting a same parameter to an entire frequency band in the communication method contiguously using the frequency; and dividing a frequency band into a plurality of frequency bands and setting a different parameter for each divided frequency band in the communication method non-contiguously using the frequency.

As described above, since the communication apparatus sets the same parameter to the entire frequency band in the communication method contiguously using the frequency, and divides the frequency band into the plurality of frequency bands and sets the different parameter for each divided frequency band in the communication method non-contiguously using the frequency, it becomes possible to obtain the reception characteristic improvement effect by a small amount of control information.

(9) In addition, an integrated circuit of the embodiment of the present invention is the integrated circuit which causes a communication apparatus to implement a plurality of functions by being mounted in the communication apparatus, the integrated circuit causing the communication apparatus to implement functions of: switching between a communication method contiguously using a frequency and a communication method non-contiguously using the frequency, setting a parameter corresponding to each communication method, and performing radio communication; setting a same parameter to an entire frequency band in the communication method contiguously using the frequency; and dividing a frequency band into a plurality of frequency bands and setting a different parameter for each divided frequency band in the communication method non-contiguously using the frequency.

As described above, since the communication apparatus sets the same parameter to the entire frequency band in the communication method contiguously using the frequency, and divides the frequency band into the plurality of frequency bands and sets the different parameter for each divided frequency band in the communication method non-contiguously using the frequency, it becomes possible to obtain the reception characteristic improvement effect by the small amount of control information.

Advantage of the Invention

According to the present invention, it becomes possible for a communication apparatus to obtain a reception characteristic improvement effect by a small amount of control information.

BEST MODES FOR CARRYING OUT THE INVENTION

Figure 6:
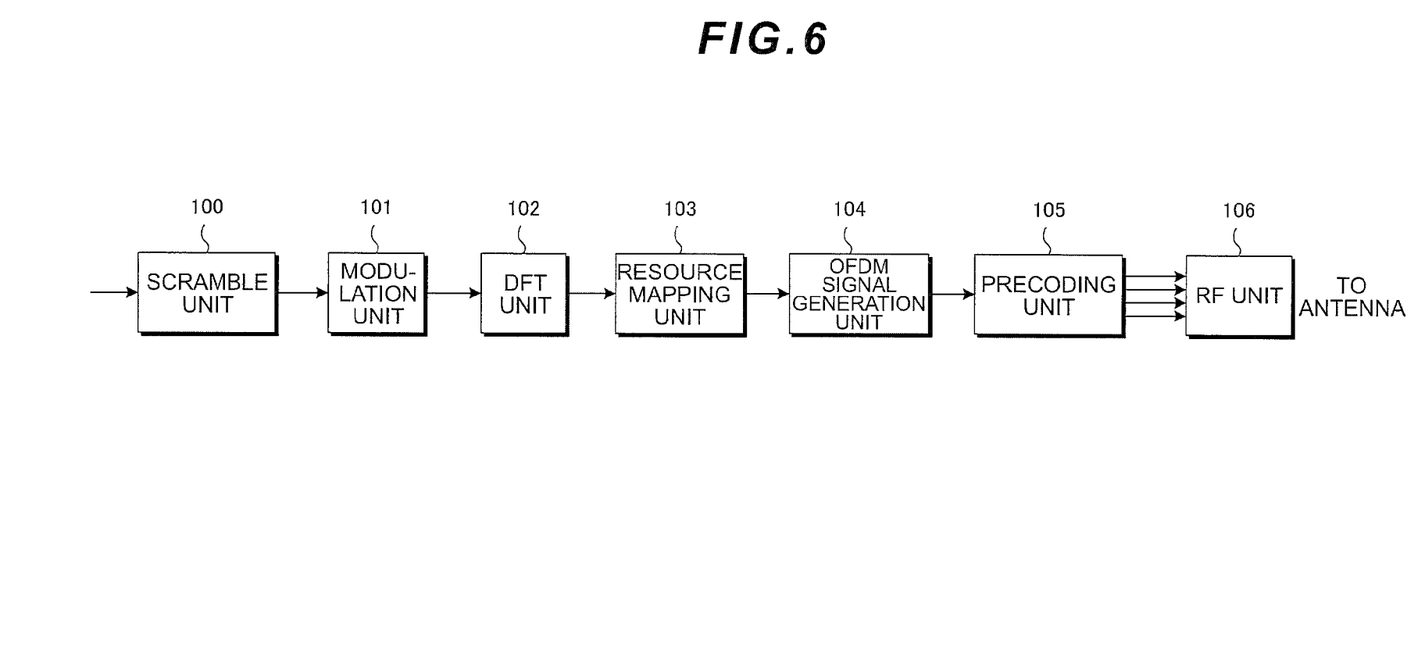
FIG. 6 is a simple block diagram of a transmitter which transmits a DFT-S-OFDM signal using precoding.

FIG. 6 is a simple block diagram of a transmitter which transmits a DFT-S-OFDM signal using precoding. In FIG. 6, a scramble unit 100 performs randomization, such as keeping privacy, to transmission data. A modulation unit 101 performs error correction and digital modulation. A DFT unit 102 performs DFT. A resource mapping unit 103 allocates data to be transmitted to a subcarrier to be transmitted. In addition, the resource mapping unit 103 performs mapping to contiguous subcarriers in generating a DFT-S-OFDM signal, and maps data in discrete subcarriers in generating a Clustered DFT-S-OFDM signal. An OFDM signal generation unit 104 generates an OFDM signal including a guard interval. A precoding unit 105 determines a phase for each antenna, and performs coding. An RF unit 106 is configured with an analog circuit from a D/A conversion (digital to analog conversion) unit to an antenna. A plurality of arrows output from the precoding unit 105 means output of precoded data for the number of antennas. It is to be noted that in FIG. 6, shown is a case where precoding common to all frequency bands to be used is performed.

Figure 7:
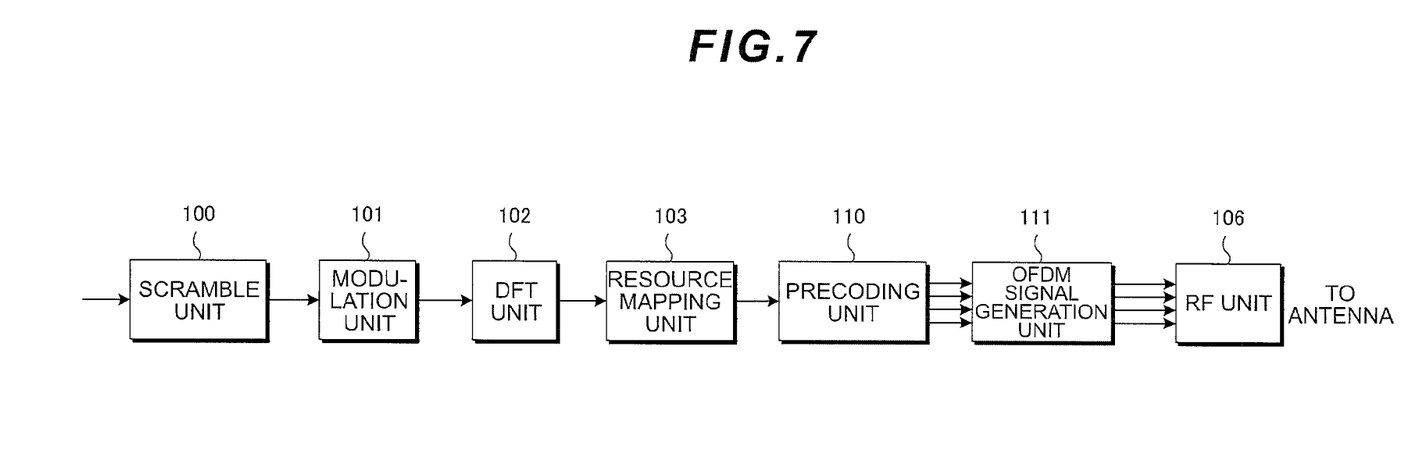
FIG. 7 is a block diagram showing a configuration of a transmitter which can apply different precoding depending on a frequency region.

FIG. 7 is a block diagram showing a configuration of a transmitter which can apply different precoding depending on a frequency region. A position of a precoding unit 110 of FIG. 7 is different compared with the transmitter of FIG. 6 which performs the same precoding to all the frequency bands. This is because different precoding needs to be performed for each frequency region, and this means that the precoding unit 110 needs to be arranged anterior to a frequency/time conversion unit of an OFDM signal generation unit 111. Since the precoding unit 110 applies different precoding for each frequency region, and outputs signals, the OFDM signal generation unit 111 needs to perform processing for the number of output signals. As a matter of course, it is easy to apply the same precoding to all the frequency bands even in the configuration in FIG. 7. Conversely, it is difficult to perform different precoding to the frequency region using the block diagram configuration shown in FIG. 6.

Next, a precoding matrix for performing precoding will be described.

$$P1 = \begin{bmatrix} 1 \\ 1 \\ 1 \\ -1 \end{bmatrix} \quad \text{[Formula 1]}$$

$$P2 = \begin{bmatrix} 1 \\ 1 \\ j \\ j \end{bmatrix} \quad \text{[Formula 2]}$$

$$P3 = \begin{bmatrix} 1 \\ 1 \\ -1 \\ 1 \end{bmatrix} \quad \text{[Formula 3]}$$

$$P4 = \begin{bmatrix} 1 \\ 1 \\ -j \\ -j \end{bmatrix} \quad \text{[Formula 4]}$$

This precoding matrix is a case of transmitting one data to be transmitted using four antennas, and it is an example of using four matrices. j denotes an imaginary unit. A transmitter selects one matrix with which a characteristic in a receiver is assumed to be the best in performing transmission, performs precoding in the precoding units 105 and 110 of FIGS. 6 and 7, and transmits data. In a transmitter of FIG. 7, a different matrix is used for each frequency region.

In the present invention, a unit by which a mobile station accesses a base station is referred to as a resource block (hereinafter, RB), and the RB is defined to be configured with one or more subcarrier(s). In addition, a cluster in Clustered DFT-S-OFDM can be configured with one or more RB(s). In the following description, DFT-S-OFDM contiguously using an RB is simply referred to as DFT-S-OFDM, and DFT-S-OFDM non-contiguously using an RB is referred to as Clustered DFT-S-OFDM.

In a first and a second embodiment, shown is a case where multiple precoding is used for Clustered DFT-S-OFDM, and single precoding is used for DFT-S-OFDM, which is because a PAPR characteristic is impaired when multiple precoding is used although the DFT-S-OFDM has a feature superior in the PAPR characteristic. However, it is also possible to apply multiple precoding to the DFT-S-OFDM using contiguous RBs, and it is not intended to except the application. In a third embodiment, shown is a case where DFT-S-OFDM and OFDM are switched to be used. Each example of communication methods shown in the first to third embodiments is one example of the above, and a communication method is not limited to these. Hereinafter, embodiments of the present invention will be described with reference to drawings.

First Embodiment

In the embodiment, will be described a mode in which a system band is previously divided to specify precoders.

Figure 1:
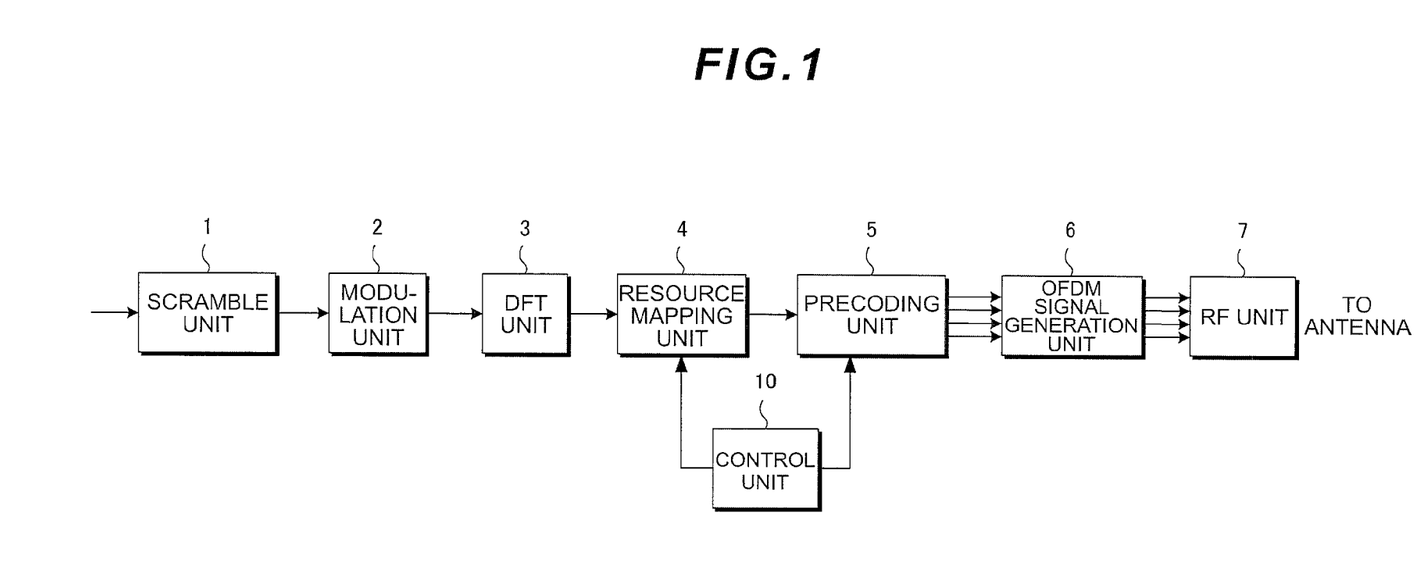
FIG. 1 is a block diagram showing a configuration of a transmitter in the present invention.

FIG. 1 is a block diagram showing a configuration of a transmitter in the present invention. It is a simple block configuration of the transmitter which can generate a Clustered DFT-S-OFDM signal. In FIG. 1, a scramble unit 1 performs randomization, such as keeping privacy, to transmission data. A modulation unit 2 performs error correction and digital modulation. A DFT unit 3 performs DFT. A resource mapping unit 4 allocates data to be transmitted to a subcarrier to be transmitted. In addition, the resource mapping unit 4 performs mapping to contiguous subcarriers in generating a DFT-S-OFDM signal, and maps data in discrete subcarriers in generating a Clustered DFT-S-OFDM signal.

A precoding unit 5 determines a phase for each antenna, and multiplies it by a precoding matrix. An OFDM signal generation unit 6 generates an OFDM signal including a guard interval. An RF unit 7 is configured with an analog circuit from a D/A conversion (digital to analog conversion) unit to an antenna. Since the precoding unit 5 applies different precoding for each frequency region, and outputs signals, the OFDM signal generation unit 6 needs to perform processing for the number of output signals.

In addition, although a control unit 10 controls each transmission block, it performs control of selection of an RB which is used by the resource mapping unit 4, and control of selection of a precoder for precoding as characteristic control of the present invention.

Figure 2:
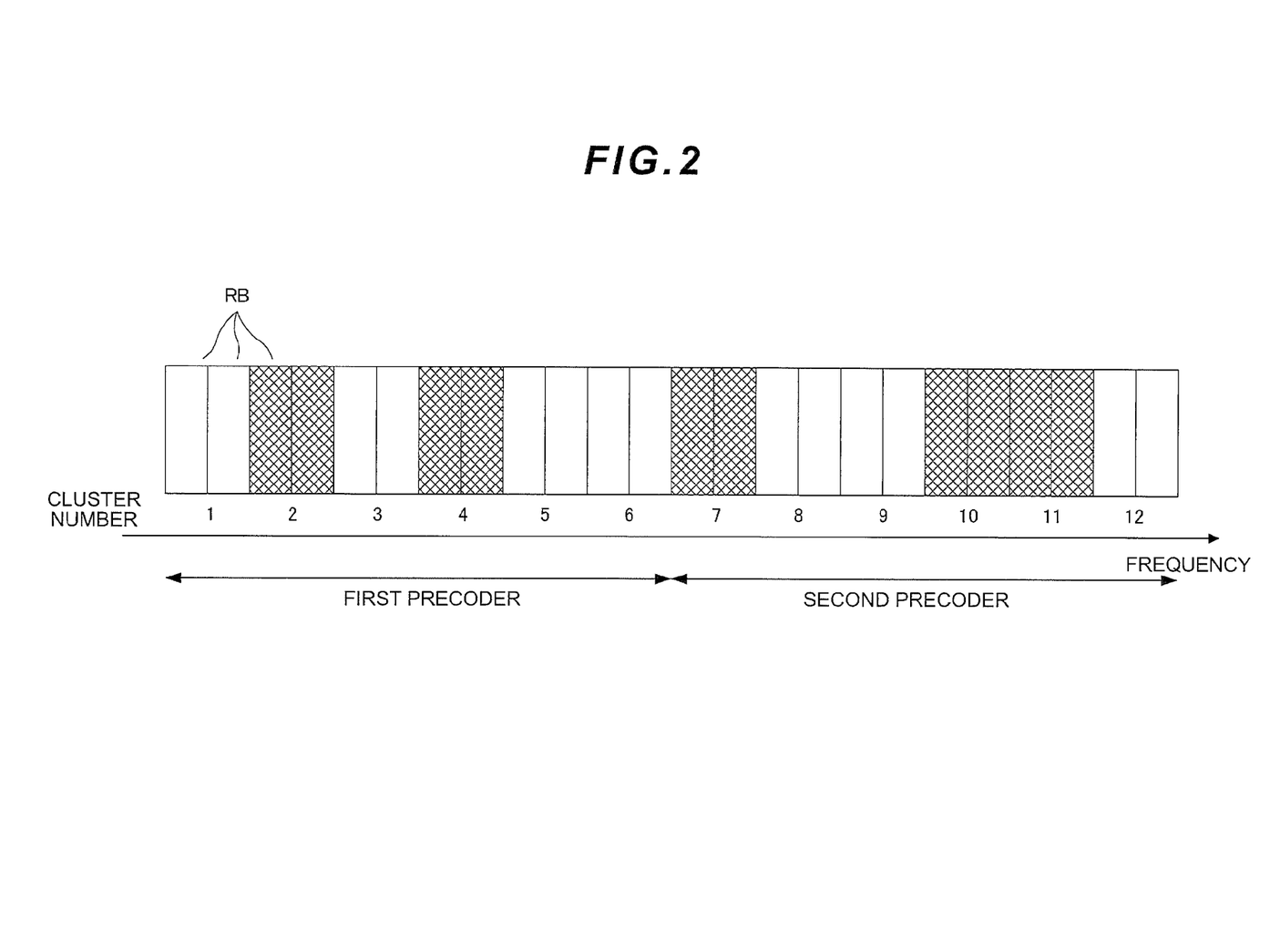
FIG. 2 is a chart showing one example of a using method of RBs of a frequency region in Clustered DFT-S-OFDM according to a first embodiment of the present invention.

FIG. 2 is a chart showing one example of a using method of RBs of a frequency region in Clustered DFT-S-OFDM according to the first embodiment of the present invention. A rectangle in the drawing indicates one RB, and shaded rectangles indicate RBs which are actually used. The number of RBs available in an entire system is twenty-four. In addition, since one cluster is configured with two RBs in this example, the number of clusters available in the entire system is twelve. A terminal is defined to perform communication using n clusters, and an RB to be used is defined to be specified by a unit of cluster. However, FIG. 2 shows a case where n=5, and indices of the clusters to be used are 2, 4, 7, 10, and 11. Assume that the bit number required for notification of one precoder is defined to be m bits, m×12 bits are required when the entire system is specified by the cluster unit, and m×n bits are required when only a cluster used for communication is specified.

In contrast, the embodiment shows a case where a frequency band is previously divided into x. FIG. 2 shows a case where x=2. When a precoder is set as described above, an amount of information required for notification of the precoder is 2×m bits. Accordingly, in the case shown in FIG. 2, it becomes possible to reduce control information by 3×m bits compared with the case where the entire system is specified by the cluster unit. In addition, it is obvious that control information is also constant regardless of the number of clusters used for communication.

However, even if such precoder is used, control information is still larger compared with a transmission method by single precoding. Hence, in order to further reduce the control information, an amount of control information in this case can be also made the same as an amount of control information required for single precoding by reducing the type of precoder, i.e., setting to be ∥m/x∥. However, ∥X∥ is an integer which does not exceed X and is nearest to X (Padding Bit etc. may be needed when X is not an integer). In the next table, shown is a specification method of a precoder when amounts of control information of single precoding and multiple precoding are set to be the same as each other. However, it is set that m=4, and x=2. This is information which a reception apparatus specifies to a transmission apparatus.

TABLE 1

|  | S or M | Precoder | Precoder | Frequency to be used |
|---|---|---|---|---|
| Single(S) | 0 |  | 0010 | XX...XX |
| Multiple(M) | 1 | 10 | 11 | YY...YY |

In the above-described table, single precoding is indicated as S, and multiple precoding is indicated as M. However, a specification method of frequencies to be used premises specifying them with the same amount of information (although the frequencies are indicated as X and Y in the table, they have no important meaning). In addition, although one bit is used in order to indicate whether precoding is single precoding or multiple precoding, the bit becomes unnecessary, and contribution to reduction of the amount of information can be achieved if it is previously defined by the system that single precoding is used in a case of contiguous frequencies to be used, and that multiple precoding is used in a case of non-contiguous frequencies to be used. In addition, when a specification method and a notification method of frequencies to be used differ between single precoding and multiple precoding, can also be used a method for selecting single precoding or multiple precoding depending on the specification method.

Although the case is shown in the above-described table where the amounts of information used for notification are the same in single precoding and multiple precoding, from a viewpoint of reducing an amount of information in a multiple precoder, can also be considered a method in which notification of the precoder is performed for a specific frequency region (or a specific cluster) by a same amount of information as a single precoder, and notification of the precoder is performed for the other frequency region (or the other cluster) by reducing the amount of information. Further, when a precoder has a particular matrix (for example, a matrix which makes transmission from a specific antenna be zero), and when the particular matrix is selected in the frequency region (or the cluster) notified by the same amount of information as the single precoder, it is also possible to place a limit of the same matrix being selected also in the other frequency region (or cluster).

Although the case where the precoder is set for each frequency region is described in the example so far, a method can also be used in which the number of clusters which can be used is simply divided by the settable number of precoders, and precoding is applied in a unit of the obtained number.

As for a system bandwidth, it is desirable to provide a system in which a bandwidth is variable depending on a situation of frequency use in each country, etc. In this case, an effect differs depending on the system bandwidth in multiple precoding which divides a system band, and thus reception performance differs when the system band differs, thereby resulting in a problem that it becomes difficult to design the system. In such system, it becomes possible to solve the above problem by setting constant the bandwidth to be divided instead of setting constant the division number with which the frequency band is divided. This method can be applied also to a communication method which does not switch communication methods.

Figure 3:
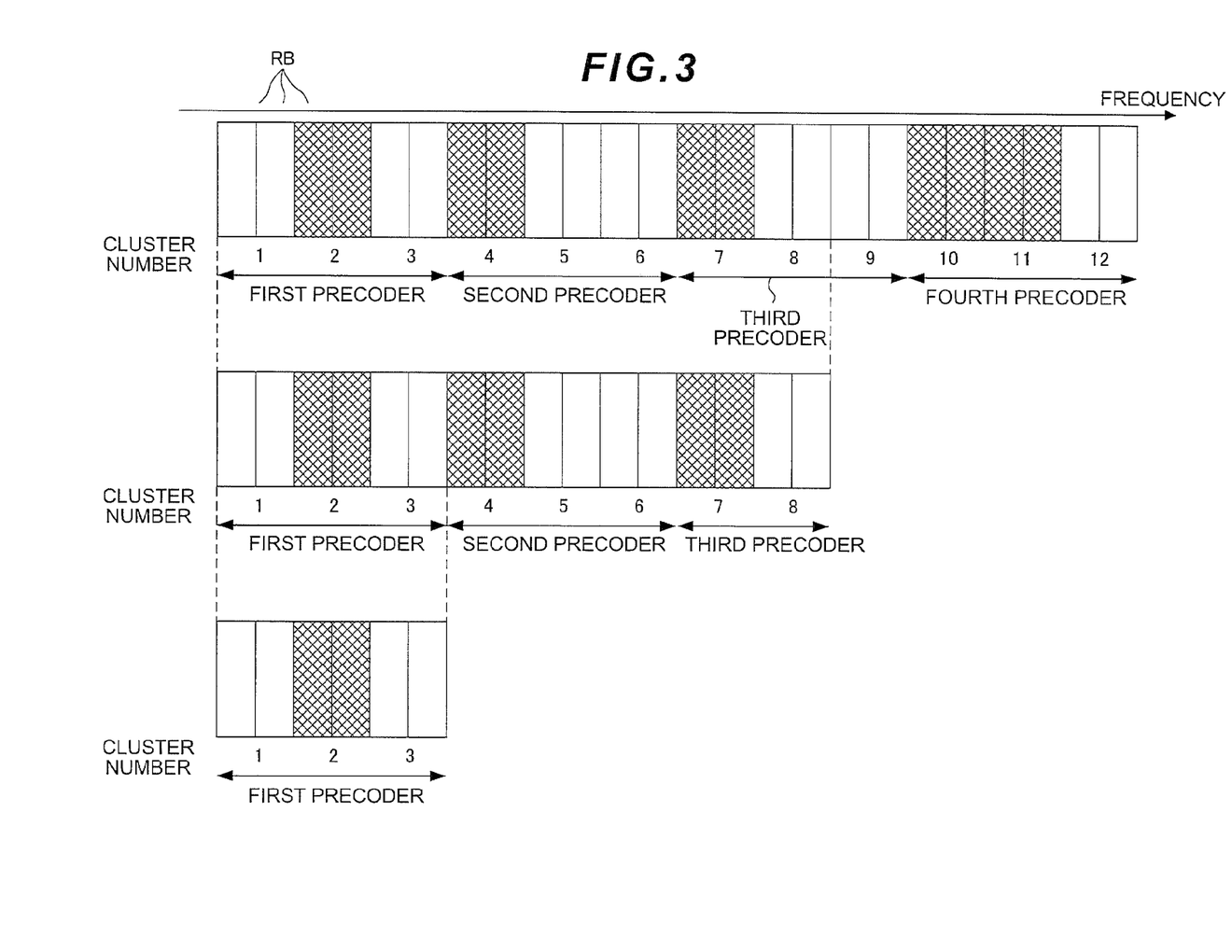
FIG. 3 is a chart showing specification methods of precoders of multiple precoding when a system bandwidth differs according to the first embodiment of the present invention.

FIG. 3 is a chart showing specification methods of precoders of multiple precoding when a system bandwidth differs according to the first embodiment of the present invention. The specification methods are aligned in the order of larger system bandwidth from the top. In a case of a system bandwidth in the middle of FIG. 3, a frequency region specified by a third precoder is smaller than specified regions of other precoders. This is an example where the system bandwidth cannot be divided into a completely constant bandwidth due to the system bandwidth.

In addition, when a limit is placed where a band is divided and discrete allocation is not performed in the divided band, an amount of information which specifies a cluster number to be used can be reduced, and such a method can be used for a radio communication system which uses only single precoding.

Second Embodiment

Although in the first embodiment, is described a method for reducing an amount of control information spent on notification of precoders, while holding an effect of multiple precoding as much as possible by specifying a precoder for each previously divided frequency region, in the embodiment, shown is a method for determining the maximum number of clusters to be used (or the division number) in Clustered DFT-S-OFDM. As being described also in the first embodiment, problems of specifying a precoder for each cluster are that an amount of control information increases as the number of clusters increases, and that the amount of control information cannot be made constant. In the embodiment, the problems can be solved by specifying the maximum division number.

Figure 4A:
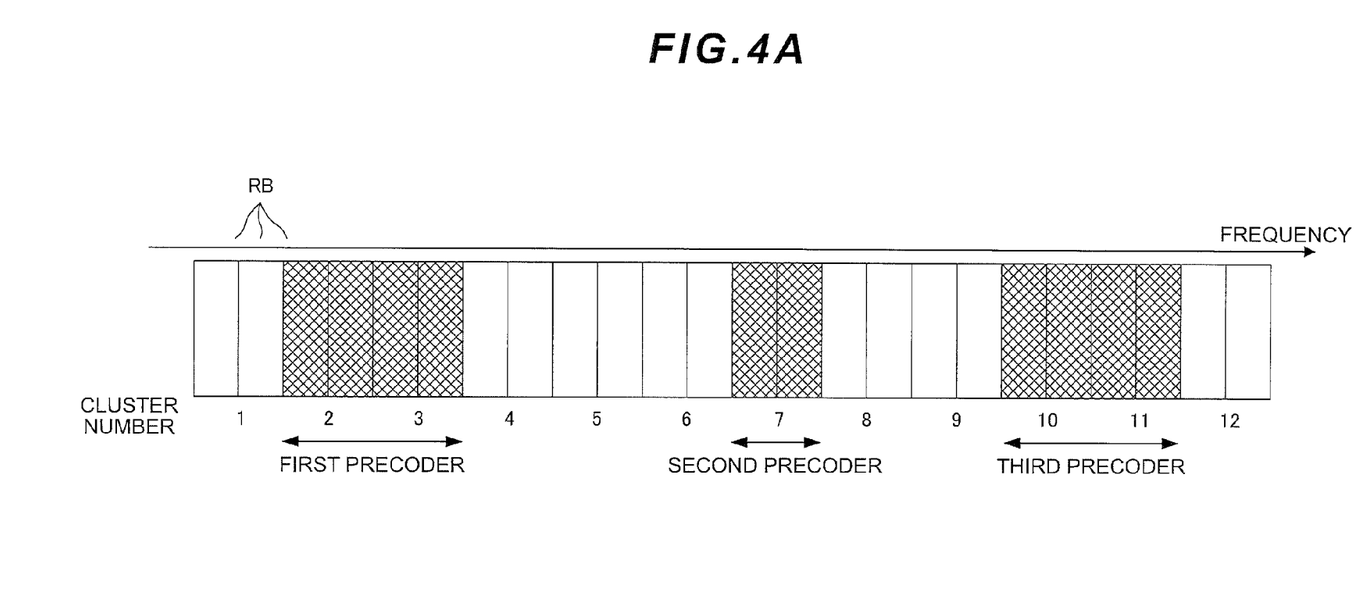
FIG. 4A is a chart showing one example of a using method of RBs of a frequency region in Clustered DFT-S-OFDM according to a second embodiment of the present invention.

FIG. 4A is a chart showing one example of a using method of RBs of a frequency region in Clustered DFT-S-OFDM according to a second embodiment of the present invention. A rectangle in the drawing indicates one RB, and shaded rectangles indicate RBs actually used. The number of RBs available in an entire system is twenty-four, and the maximum division number is set to be three. In addition, 1 cluster is configured with two RBs in this example, a terminal is defined to perform communication using n clusters, and an RB to be used is defined to be specified by a unit of cluster. However, FIG. 4A shows a case where n=5, and cluster indices to be used are 2, 3, 7, 10, and 11. Assume that a bit number required for notification of one precoder is defined to be m bits, m×12 bits are required when the entire system is specified by the cluster unit, and m×n bits are required when only a cluster used for communication is specified.

In contrast, the embodiment shows a case where the maximum division number is previously defined as y. FIG. 4A shows a case where y=3. When a precoder is set as described above, an amount of information required for notification of the precoder is 3×m bits. Accordingly, in the case shown in FIG. 4A, it becomes possible to reduce control information by 2×m bits compared with the case of specifying the precoder by the cluster unit. In addition, it is obvious that control information is also constant regardless of the number of clusters used for communication.

Figure 4B:
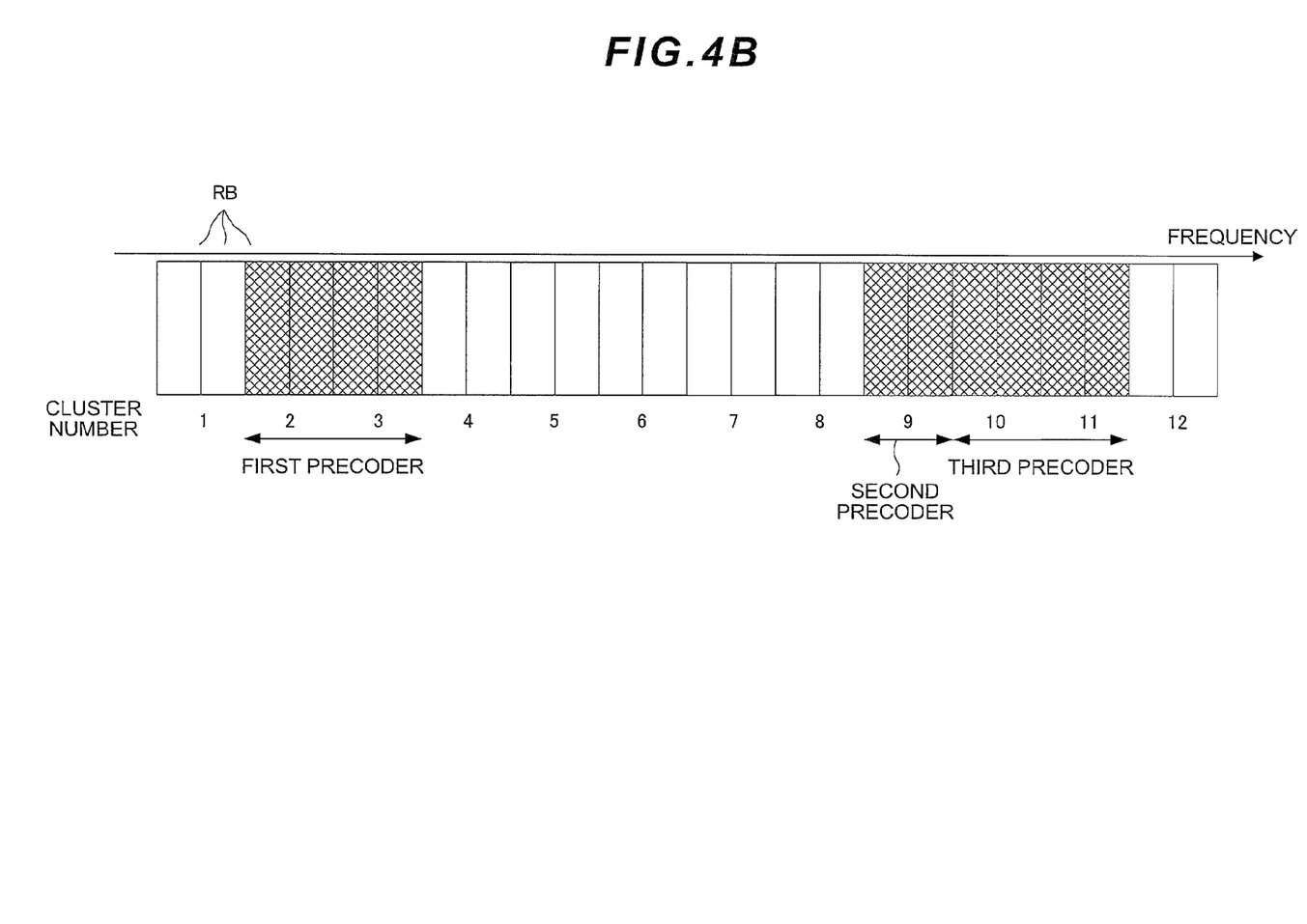
FIG. 4B is a chart showing one example of a using method of the RBs of the frequency region in Clustered DFT-S-OFDM according to the second embodiment of the present invention.

FIG. 4B is a chart showing one example of a using method of RBs of a frequency region in Clustered DFT-S-OFDM according to the second embodiment of the present invention. As shown in FIG. 4B, there is a problem in a case where RBs divided by chance are contiguous even when divided into three. In such a case, it is considered that the division number is two, and then a precoder may just be set. At this time, contiguous clusters correspond to "each non-contiguously arranged frequency band". On the premise that an amount of control information is constant, in a case of FIG. 4B, a first and a second precoder are specified, and dummy information is inserted in a third precoder. In addition, if a specification method of clusters to be used is a method which specifies a first cluster number f and the number of contiguous clusters k as a form like (f, k) instead of a bitmap for each cluster, three precoders can be set without difficulty if a precoder is set for each of the specifications. In a case of FIG. 4B, (2, 2), (9, 1), and (10, 2), and RBs to be used are specified in each frequency band.

It is to be noted that as is described in the first embodiment, in order to further reduce control information, an amount of control information in this case can also be made the same as an amount of control information required for single precoding by reducing the type of precoder, i.e., defining to be $\|m/x\|$.

As being described also in the first embodiment, as for a system bandwidth, it is desirable to provide a system in which a bandwidth is variable depending on a situation of frequency use in each country, etc. In this case, when the maximum number of clusters and the division number are determined without considering the system bandwidth, a limit is caused in how to allocate an RB when the bandwidth is wide, thus resulting in very poor efficiency. In such system, it becomes possible to solve the above problem by changing the maximum division number according to the system bandwidth. This method can be applied also to a communication method which does not switch communication methods.

Figure 5:
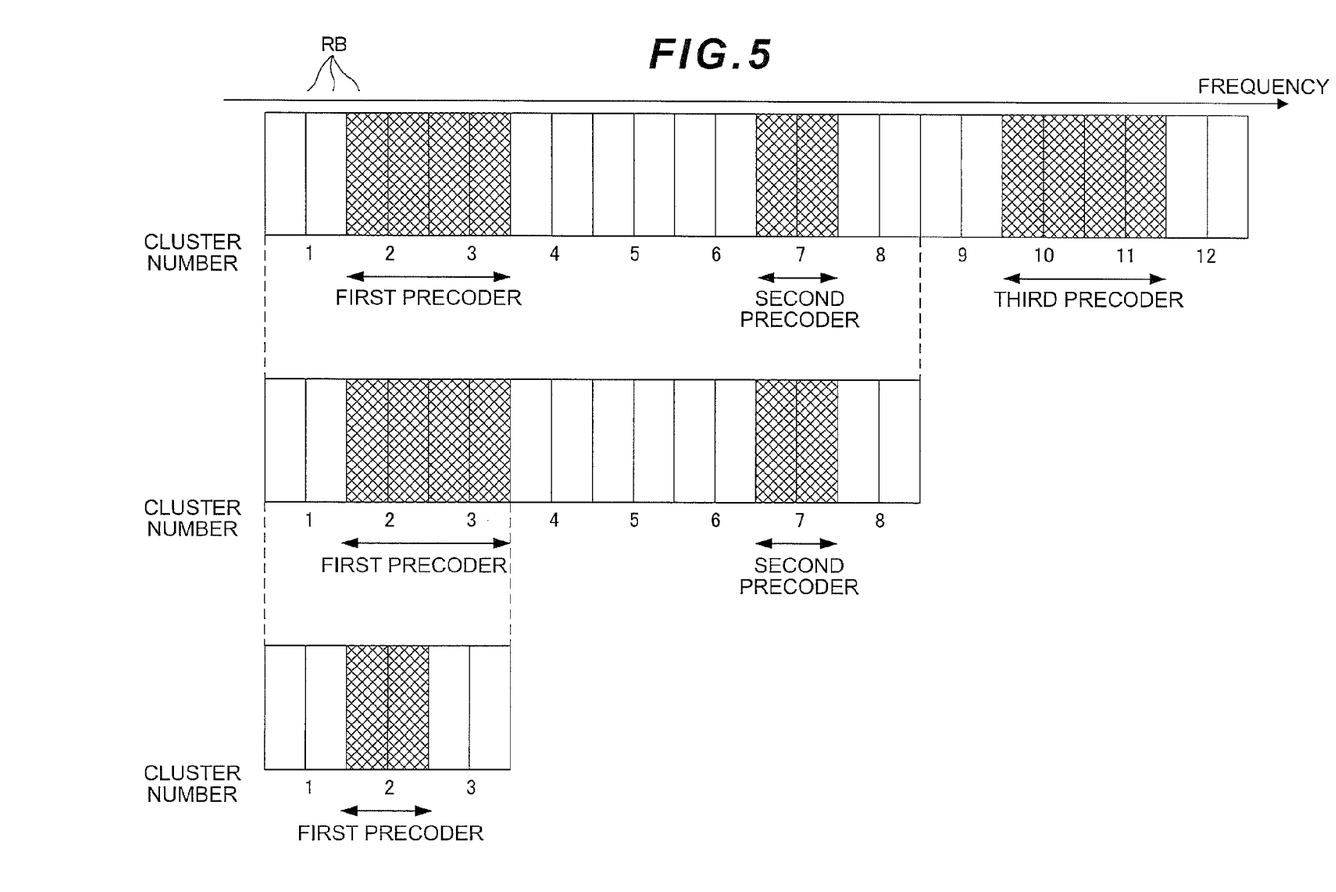
FIG. 5 is a chart showing specification methods of precoders of multiple precoding when a system bandwidth differs according to the second embodiment of the present invention.

FIG. 5 is a chart showing specification methods of precoders of multiple precoding when a system bandwidth differs according to the second embodiment of the present invention. The specification methods are aligned in the order of larger system bandwidth from the top, and they are cases where the maximum division number is set to be 3, 2, and 1 in order. It becomes possible to reduce control information as much as possible, while obtaining a gain of multiple precoding by determining the maximum division number depending on the system bandwidth as described above.

It is needless to say that the method for determining the maximum division number according to the system bandwidth can be applied to a system which uses only single precoding, and it becomes possible to flexibly specify a precoder according to the system bandwidth.

Third Embodiment

Although cases of using DFT-S-OFDM and Clustered DFT-S-OFDM are described by taking a precoder as an example in the first and the second embodiments, it becomes possible to apply to information other than the precoder the methods for suppressing the amount of control information as shown in the first and the second embodiments, for example, when Clustered DFT-S-OFDM is replaced with OFDM. Here, it is because both Clustered DFT-S-OFDM and OFDM have in common to be the methods with which a PAPR characteristic deteriorates with respect to DFT-S-OFDM that an example of replacing Clustered DFT-S-OFDM with OFDM is described. It is possible to apply the first and the second embodiments to the following information other than the precoder.

One of the information is a modulation scheme. Since DFT-S-OFDM divides the spectrum into frequency regions and transmits them, a modulation scheme cannot be determined for each cluster. However, it is possible to specify a modulation scheme and a coding rate by a cluster unit (also by a subcarrier unit) in the OFDM. Accordingly, application of the first and the second embodiments allows to perform adaptive modulation by the cluster unit for which the modulation scheme can be specified, while suppressing an amount of information for specifying the modulation scheme, etc.

A similar effect can be obtained also in a transmit power. When the transmit power is changed by the cluster unit in DFT-S-OFDM, inter-symbol interference occurs simultaneously depending on a demodulation scheme although a characteristic improvement effect by improvement of power can be obtained, also causing a factor of deterioration of the characteristic. However, in the OFDM, the characteristic improvement effect due to increased power can be expected as is. Accordingly, application of the first and the second embodiments allows to control a transmit power by a cluster unit for which the transmit power can be specified, while suppressing an amount of information for specifying the transmit power.

A program which operates in a mobile station apparatus and a base station apparatus according to the present invention may be the program (program which causes a computer to function) which controls a CPU etc. so as to achieve functions in the above-described embodiments according to the present invention. Additionally, information dealt with in these apparatuses is temporarily stored in RAM at the time of processing thereof, subsequently stored in various ROMs and HDDs, and the information is read, corrected/written by the CPU if needed. As a recording medium which stores the program, may be used any of a semiconductor medium (for example, a ROM, a nonvolatile memory card, etc.), an optical recording medium (for example, a DVD, an MO, an MD, a CD, a BD, etc.), and a magnetic recording medium (for example, a magnetic tape, a flexible disk, etc.). In addition, not only the above-mentioned functions of the embodiments are achieved by executing the loaded program, but functions of the present invention may be achieved by processing information in cooperation with an operating system or other application programs, etc. based on an instruction of the program.

In addition, when the program is made to be distributed in the market, the program can be stored in a portable recording medium and then distributed, or it can be transferred to a server computer connected through a network, such as the Internet. In this case, a memory storage of the server computer is also included in the present invention. In addition, some or all of the mobile station apparatus and the base station apparatus in the above-mentioned embodiments may be achieved as an LSI, which typically is an integrated circuit. Each functional block of the mobile station apparatus and the base station apparatus may be formed into a chip individually, or some or all of them may be integrated to be formed into a chip. In addition, a technique for forming the functional blocks into an integrated circuit may be achieved not only as the LSI but as a dedicated circuit or a general-purpose processor. In addition, when a technique for forming the functional blocks into the integrated circuit as an alternative to the LSI appears due to progress of a semiconductor technology, it is also possible to use an integrated circuit made by the technique.

As described above, although the embodiments of the present invention are mentioned in detail with reference to the drawings, a specific configuration is not limited to the embodiments, and a design etc. in the scope not departing from the gist of the present invention are also included in the claims.

DESCRIPTION OF SYMBOLS 4, 103: Resource mapping unit
5, 105, 110: Precoding unit
6, 104, 111: OFDM signal generation unit
7, 106: RF unit
10: Control unit

The invention claimed is:

1. A communication apparatus transmitting data using one of a first communication method and a second communication method, the communication apparatus comprising:
   a control unit configured to set a single parameter, in a case of transmitting the data using the first communication method, the first communication method allocating a plurality of subcarriers continuously to form a single cluster, or configured to set at least a first parameter and a second parameter in each of a first cluster and a second cluster, in a case of transmitting the data using the second communication method, the second communication method non-continuously allocating the plurality of subcarriers in at least the first cluster and the second cluster, wherein the first cluster includes a first predetermined portion of the plurality of subcarriers continuously allocated to form the first cluster and the second cluster includes a second predetermined portion of the plurality of subcarriers continuously allocated to form the second cluster; and
   two or more transmission antennas configured to transmit the data generated by using a single precoding in a case that one or more clusters allocated using one of the first communication method and the second communication method are included in a first region of a frequency band that is available by the communication apparatus, or configured to transmit the data generated by using a multiple precoding in a case that a part of one or more clusters allocated using one of the first communication method and the second communication method are included in the first region of the frequency band that is available by the communication apparatus, wherein
   the two or more transmission antennas are configured to receive first information and second information, wherein the first information indicates the set parameter and the second information indicates one of the first communication method and the second communication method, and
   an information amount in a case that the first information indicates the first communication method is the same as an information amount in a case that the first information indicates the second communication method.

2. A method of transmitting data using one of a first communication method and a second communication method, the method comprising:
   setting a single parameter, in a case of transmitting the data using the first communication method, the first communication method allocating a plurality of subcarriers continuously to form a single cluster, or setting at least a first parameter and a second parameter in each of a first cluster and a second cluster, in a case of transmitting the data using the second communication method respectively, the second communication method non-continuously allocating the plurality of subcarriers in at least the first cluster and the second cluster, wherein the first cluster includes a first predetermined portion of the plurality of subcarriers continuously allocated to form the first cluster and the second cluster includes a second predetermined portion of the plurality of subcarriers continuously allocated to form the second cluster;
   transmitting the data generated by using a single precoding in a case that one or more clusters allocated using one of the first communication method and the second communication method are included in a first region of a frequency band that is available by a communication apparatus;

transmitting the data generated by using a multiple precoding in a case that a part of the one or more clusters allocated using one of the first communication method and the second communication method are included in the first region of the frequency band which is available by the communication apparatus; and receiving first information and second information, wherein the first information indicates the set parameter and the second information indicates one of the first communication method and the second communication method, wherein an information amount in a case that the first information indicates the first communication method is the same as an information amount in a case that the first information indicates the second communication method.

* * * * *